UNITED STATES PATENT OFFICE.

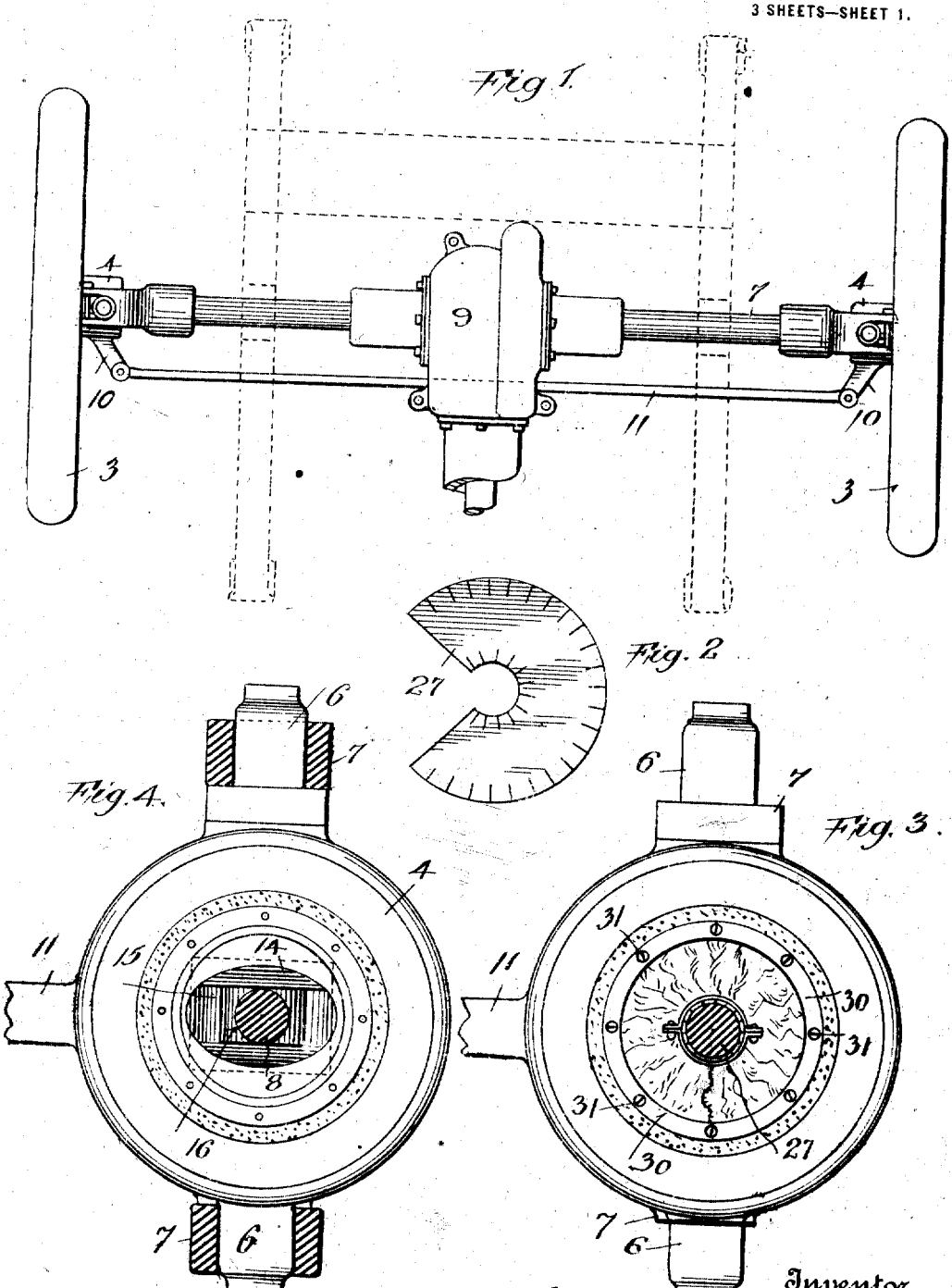

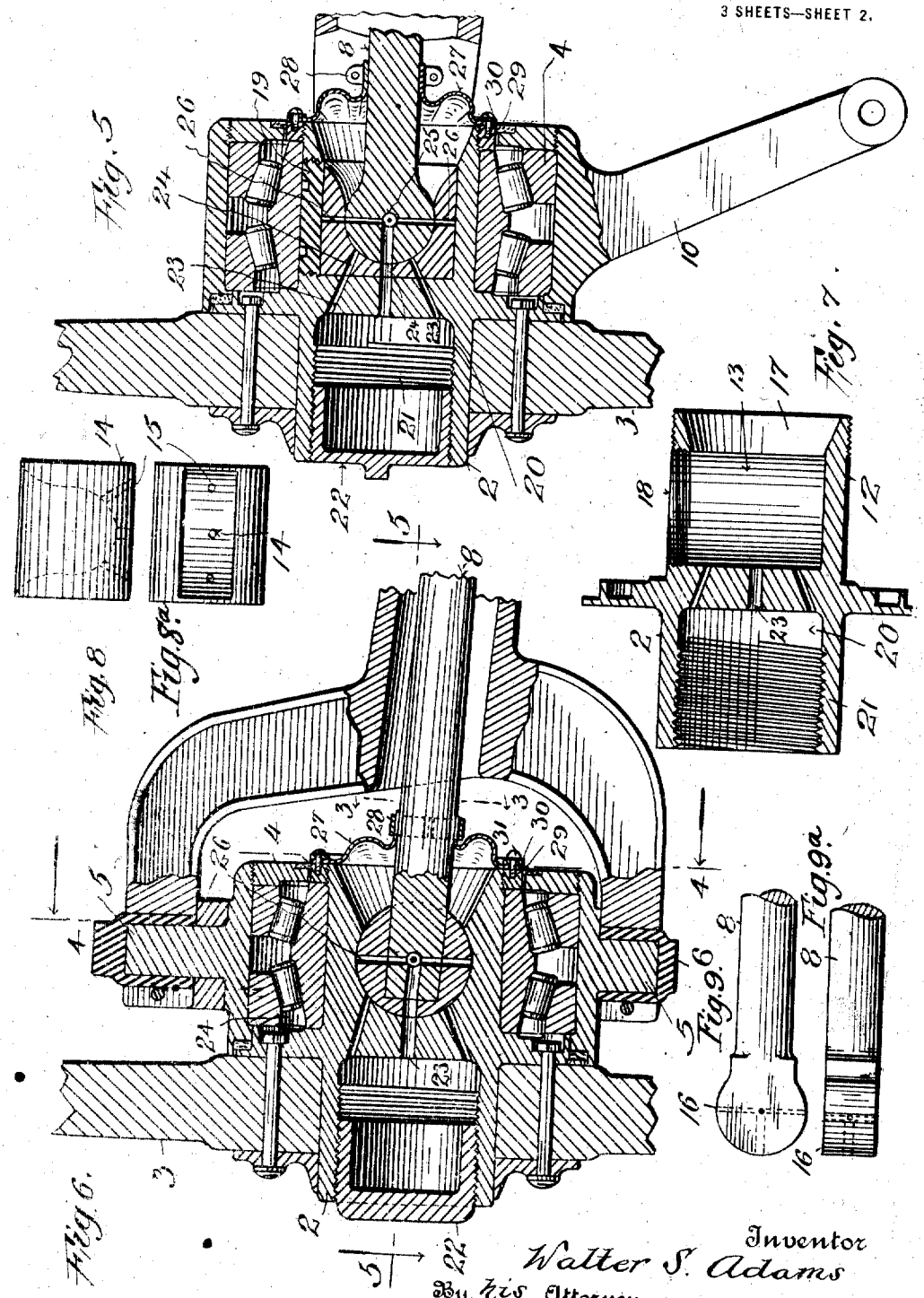

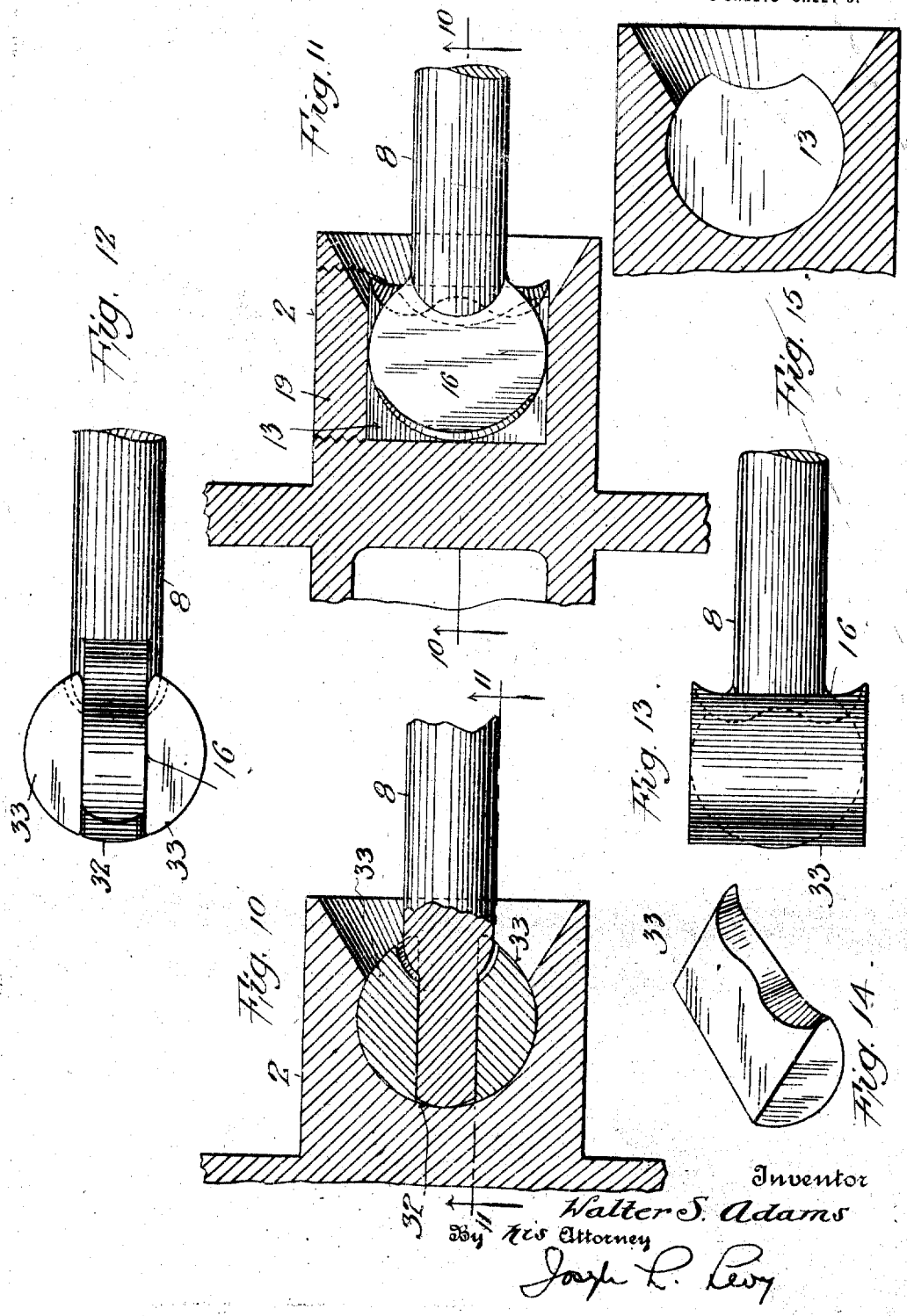

WALTER S. ADAMS, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

UNIVERSAL JOINT.

1,225,303.     Specification of Letters Patent.     Patented May 8, 1917.

Application filed February 17, 1916. Serial No. 78,815.

*To all whom it may concern:*

Be it known that I, WALTER S. ADAMS, a citizen of the United States, and a resident of the city and county of Philadelphia and State of Pennsylvania, have invented a new and useful Improvement in Universal Joints, of which the following is a specification.

The object of my invention is to provide a joint of this class which is suitable for transmitting power, without undue friction or stress upon small surfaces, and its object is accomplished by my invention, one embodiment of which is hereinafter set forth.

For a more particular description of my invention, reference is to be had to the accompanying drawings forming a part hereof, in which—

Figure 1 is a plan view of my invention applied to the front wheels of an automobile;

Fig. 2 shows the development of a washer for keeping dirt from my improved joint;

Figs. 3, 4 and 5 are sectional views taken on the lines 3—3, 4—4 and 5—5 respectively of Fig. 6, looking in the direction of the arrows;

Fig. 6 is a sectional view taken at right angles to the section shown in Fig. 5;

Fig. 7 is a sectional view showing a part of my improved joint;

Fig. 8 is a side elevation of one of the parts of my improved universal joint;

Fig. 8ª is a plan view of the part shown in Fig. 8;

Fig. 9 is a side elevation of the end portion of the power transmitting shaft;

Fig. 9ª is a plan view of the same.

Fig. 10 is a sectional view taken on the line 10—10 of Fig. 11, looking in the direction of the arrows; and Fig. 11 is a sectional view taken on line 11—11 of Fig. 10, both sections showing a modified structure;

Figs. 12 and 13 respectively, are a plan and side elevation, respectively, of a rod and cylinder members of the structure shown in Figs. 10 and 11; and Fig. 14 shows one of the cylinder members; and Fig. 15 is a sectional view showing a cup in which the cylinder members rest, together with the curved end of the shaft.

Throughout the various views of the drawings, similar reference characters designate similar parts.

My improved joint 1 may be applied to any suitable use, as where power is to be transmitted through a universal joint as to the front wheels of an automobile, which wheels are also connected with the steering gear. When put to such use, it is essential that the joints should never bind, and should always work without undue friction, and be properly lubricated. My invention fulfils all these requirements, as will now appear.

The joint 1 in the embodiment of my invention herein described is attached to a hub 2 of an automobile wheel 3 and its hub also carries suitable roller bearings 4 of the conventional form, which are connected to laterally extending trunnions 5 which turn in suitable bearings 6 in the main axle 7 of an automobile. This axle is hollow, so as to receive the shaft 8 which runs to the differential gearing 9, carried at the middle of the same in the conventional way. In addition to the trunnions 5, the bearings 4 are provided with the transversely disposed ears 10 which are connected by a rod 11 with the steering gear, in the conventional manner.

Except for the details hereinafter mentioned, the above numbered elements may be of the conventional form and form no part of this invention.

The hub 2 has a cylindrical projection 12 which extends within the plane of the roller bearing 4, to which it is connected, and this projection 12 is provided with a cylindrical hole 13 which runs with its axis at right angles to the axis of the hub 2, to receive a cylinder 14, see Fig. 8, and this cylinder 14 has a recess 15 flared at its exterior end and circular in cross section at its other end, as shown, to receive the flat sided cylindrical end 16, see Fig. 9, of the rod or shaft 8.

When the parts 12, 14 and 16 are assembled, as shown, the flat sided cylindrical end 16 of the rod 8 enters the slot or recess in the cylinder 14 which is in the cylindrical projection 12 of the hub 2 and this rod enters through the flared opening 17, which extends laterally from the cylindrical opening 13 and at right angles thereto and in the direction of the axis of the hub 2, and the parts are so united that by revolving shaft 8 power is transmitted from this rod or shaft 8 by the flat sided surfaces 16 to the hub 2. To keep the socket 14 in place, suitable screw threads 18 are placed at one end of the opening 13 and a plug 19 is fitted in said threads and prevented from shifting or escaping by means of the roller bearings 4 on the outside thereof.

To provide for efficient lubrication, the hub 2 is provided with a cylindrical opening 20 at its outer end, which opening is screw threaded at 21 to receive a suitable plug 22 which may be readily removed for the insertion of grease in the opening 20. By turning the plug 22, this grease may be forced through suitable ports 23 which connect the opening 20 with the opening 13, as shown.

Other ports 24 are placed in the socket 14 which are adapted to register, under normal conditions, with the ports 23, and corresponding ports 25 are placed in the cylindrical end 16 of the shaft 8, and additional ports 26 are placed in the ends of the sockets 14 so as to provide for the lubrication of the ends of the socket through the ports 25.

To keep all dirt and grit away from my improved joint, I provide a suitable washer 27 which is made of cloth, or other suitable material, cut as indicated in Fig. 2, and secured with one end about the rod 8 by a ring 28 and the other end against a ring 29 by an annulus 30 and the screws 31 which hold said annulus in place. The ring 29 holds the roller bearings 4 in place on the hub 2, as shown.

In view of the foregoing, the construction and use of my improved joint will be readily understood.

Assuming that the opening 20 is filled with grease and the plug 22 is in place, grease is forced through the ports 23, 24, 25 and 26 under the pressure exerted by the plug 22, and this grease reaches the surfaces to be lubricated when power is transmitted, and the axis of the wheel 3 does not coincide with the axis of the shaft 8, there is a slight relative movement between these parts when turning and power is transmitted through the cylinder 14, which has a slight oscillation in its bearings, and the same is true of the cylindrical end 16 of the shaft 8. These parts 12, 14 and 16, coöperating together with their axes at right angles to each other, constitute a universal joint with large bearing and lubricated surfaces, which it is the object of my invention to secure.

In the modification shown in Figs. 10 to 15 inclusive, the hub 2 is the same as before except that the oil ducts may be omitted for reasons which will appear below.

The driving shaft 8 is the same as before except that its extreme end is slightly beveled at 32 so as to always properly fit the side of the hole 13 in the hub 2. In this embodiment of my invention the cylinder 14 is done away with and in place thereof there are used two cylindrical segments 33, each of which is shaped substantially as shown, and is a little less than a third of a cylinder of a proper size to fit the hole 13 and is divided on planes running parallel with the axis and coinciding with the plane surfaces of the flat head 16, of the rod 8, so that these flat surfaces of the rod bear against the corresponding flat surfaces of the segments 33, and the three parts, when assembled together, as shown in Fig. 12, produce what is substantially a cylindrical surface except for the recess adjacent to the beveled portion 32 of the rod 8. This recess forms a grease receiving recess which may be so used if desired and grease may be packed therein. It will be noticed that in this modification the rod 8 turns in the hub 2 precisely as in the other modification and may be withdrawn from its cylindrical segments 33 in the same way that the rod 8 may be withdrawn from the cylinder 14. There is, however, this difference. If the cylinder 15 is to be withdrawn it is necessary to remove the roller bearings and all parts incidental thereto and then the plug 19. In the structure shown in Figs. 10 to 15 the rod 8 may be first removed and then one of the segments 33 and then the other so that all these three parts may be withdrawn from the hub 2 without in any way disturbing the roller bearings or the plug 19. In this modification of the invention, the plug 19 has no function except to make the boring of the recess, for the parts 33 and 16, easier than it would otherwise be.

When the parts are assembled to the position shown in Figs. 10 and 11 the easiest way is to first place one of the segmental parts 33 in the recess 13 while the axis of the recess 13 is vertically disposed and then the other part 33 may be similarly placed in position, and finally part 16 of the rod 8 may be placed in between them.

While I have shown and described some embodiments of my invention, it is obvious that it is not restricted thereto, but is broad enough to cover all structures which come within the scope of the annexed claims.

Having thus described my invention, what I claim is:

1. In a device of the class described, a casing, a cylinder rotatively mounted in said casing, said casing having an opening through which said cylinder is placed within the casing, means for closing the opening through which the cylinder is passed, the cylinder having an opening and a shaft having a head movably mounted in the opening in said cylinder, said shaft head being removable from the opening in the cylinder without removing said cylinder from its casing.

2. In a device of the class described, a casing, a cylinder rotatively mounted therein, the casing having an opening through which the cylinder is passed, a cap for said opening to close the same, said cylinder having an opening, a shaft having a head fitting the opening in the cylinder adapted to pivot about an axis at right angles to the axis of the cylinder, said shaft head being removable from the opening in the cylinder without removing said cylinder from its casing.

Signed at the city, county of Philadelphia, and State of Pennsylvania, this 14th day of February, 1916.

WALTER S. ADAMS.